(12) United States Patent
Surace

(10) Patent No.: US 10,240,479 B2
(45) Date of Patent: Mar. 26, 2019

(54) VARIABLE AREA TURBINE ARRANGEMENT FOR A GAS TURBINE ENGINE

(71) Applicant: UNITED TECHNOLOGIES CORPORATION, Farmington, CT (US)

(72) Inventor: Raymond Surace, Newington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 422 days.

(21) Appl. No.: 14/909,209

(22) PCT Filed: Aug. 4, 2014

(86) PCT No.: PCT/US2014/049536
§ 371 (c)(1),
(2) Date: Feb. 1, 2016

(87) PCT Pub. No.: WO2015/069334
PCT Pub. Date: May 14, 2015

(65) Prior Publication Data
US 2016/0186600 A1 Jun. 30, 2016

Related U.S. Application Data

(60) Provisional application No. 61/863,000, filed on Aug. 7, 2013.

(51) Int. Cl.
*F01D 9/04* (2006.01)
*F01D 9/06* (2006.01)
(Continued)

(52) U.S. Cl.
CPC .......... *F01D 17/162* (2013.01); *F01D 9/041* (2013.01); *F01D 9/06* (2013.01); *F02C 9/20* (2013.01); *F05D 2220/32* (2013.01)

(58) Field of Classification Search
CPC .......... F01D 17/16; F01D 17/162; F01D 9/04; F01D 9/041; F02C 9/20
(Continued)

(56) References Cited

U.S. PATENT DOCUMENTS 3,449,914 A * 6/1969 Brown ...................... F02K 1/15
405/215
3,861,822 A 1/1975 Wanger
(Continued)

FOREIGN PATENT DOCUMENTS

DE 2513581 9/1976

OTHER PUBLICATIONS

"Fundamentals of Gas Turbine Engines" retrieved from http://www.cast-safety.org/pdf/3_engine_fundamentals.pdf, available as of Aug. 21, 2010.*
(Continued)

*Primary Examiner* — Igor Kershteyn
*Assistant Examiner* — Topaz L. Elliott
(74) *Attorney, Agent, or Firm* — Carlson, Gaskey & Olds, P.C.

(57) ABSTRACT

A variable area turbine arrangement according to an exemplary aspect of the present disclosure includes, among other things, a first turbine section having at least a first variable vane row and a second turbine section downstream from the first turbine section and having at least a second variable vane row. A transition duct is disposed between the first turbine section and the second turbine section.

19 Claims, 2 Drawing Sheets

(51) Int. Cl.
*F02C 9/20* (2006.01)
*F01D 17/16* (2006.01)

(58) Field of Classification Search
USPC .......................................................... 415/155
See application file for complete search history.

(56) References Cited

U.S. PATENT DOCUMENTS

| | | | | |
|---|---|---|---|---|
| 3,990,810 | A * | 11/1976 | Amos | F01D 17/162 415/161 |
| 4,013,377 | A | 3/1977 | Amos | |
| 4,043,121 | A * | 8/1977 | Thomas | F02K 3/075 415/78 |
| 4,080,785 | A * | 3/1978 | Koff | F02K 3/075 415/69 |
| 5,397,215 | A * | 3/1995 | Spear | F01D 5/143 415/191 |
| 5,911,679 | A * | 6/1999 | Farrell | F01D 17/162 415/149.2 |
| 5,931,636 | A * | 8/1999 | Savage | F01D 17/141 415/115 |
| 7,837,444 | B2 * | 11/2010 | Conrad | C23C 30/00 228/118 |
| 7,854,112 | B2 | 12/2010 | Roberge | |
| 7,877,980 | B2 * | 2/2011 | Johnson | F02K 3/075 60/226.1 |
| 8,161,728 | B2 * | 4/2012 | Kupratis | F02K 3/077 415/124.1 |
| 8,262,345 | B2 | 9/2012 | Andrew | |
| 8,622,687 | B2 * | 1/2014 | Giffin | F02K 3/075 415/1 |
| 2006/0275111 | A1 | 12/2006 | Orlando et al. | |
| 2007/0119150 | A1 | 5/2007 | Wood et al. | |
| 2007/0214795 | A1 * | 9/2007 | Cooker | F02K 1/06 60/772 |
| 2010/0202873 | A1 | 8/2010 | Andrew | |
| 2011/0171007 | A1 * | 7/2011 | Johnson | F01D 17/162 415/145 |
| 2013/0104521 | A1 | 5/2013 | Kupratis | |

OTHER PUBLICATIONS

International Preliminary Report on Patentability for International Application No. PCT/US2014/049536 dated Feb. 18, 2016.
The Extended European Search Report for EP Application No. 14860068.7, dated Feb. 16, 2017.
International Search Report and Written Opinion of the International Searching Authority for International application No. PCT/US2014/049536 dated May 20, 2015.

* cited by examiner

VARIABLE AREA TURBINE ARRANGEMENT FOR A GAS TURBINE ENGINE

This invention was made with government support under Contract No. N00014-09-D-0821-0006, awarded by the United States Navy. The Government therefore has certain rights in this invention.

BACKGROUND

This disclosure relates to a gas turbine engine, and more particularly to a variable area turbine arrangement.

Gas turbine engines typically include at least a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

The compressor and turbine sections of a gas turbine engine typically include alternating rows of rotating blades and flow directing vanes. In the turbine section, the rotating blades extract energy from the airflow that is communicated through the gas turbine engine, while the vanes direct the airflow to a downstream row of blades.

The vanes can be manufactured to a fixed flow area that is optimized for a single flight point. Alternatively, it is possible to alter the flow area between two adjacent vanes by providing one or more variable vanes that rotate about a given axis to vary the flow area. Altering the flow area in this manner can expose downstream components to incidence angle variation. In other words, the flow angle of the hot combustion gases may change as it is communicated to downstream locations by rotating the variable vanes at an upstream location.

SUMMARY

A variable area turbine arrangement according to an exemplary aspect of the present disclosure includes, among other things, a first turbine section having at least a first variable vane row and a second turbine section downstream from the first turbine section and having at least a second variable vane row. A transition duct is disposed between the first turbine section and the second turbine section.

In a further non-limiting embodiment of the foregoing variable area turbine arrangement, at least one stationary vane is positioned within the transition duct.

In a further non-limiting embodiment of either of the foregoing variable area turbine arrangements, at least one stationary vane is positioned directly upstream of the second variable vane.

In a further non-limiting embodiment of any of the foregoing variable area turbine arrangements, the second variable vane row is positioned at an inlet of the second turbine section.

In a further non-limiting embodiment of any of the foregoing variable area turbine arrangements, the variable area turbine arrangement is part of a low pressure turbine arrangement.

In a further non-limiting embodiment of any of the foregoing variable area turbine arrangements, each of the first variable vane row and the second variable vane row includes a spindle that extends along a variable vane spindle axis.

In a further non-limiting embodiment of any of the foregoing variable area turbine arrangements, the transition duct includes an array of stationary vanes that extend between a radially outer wall and a radially inner wall of the transition duct.

In a further non-limiting embodiment of any of the foregoing variable area turbine arrangements, the second variable vane row extends radially outboard relative to the first variable vane row.

In a further non-limiting embodiment of any of the foregoing variable area turbine arrangements, the first turbine section is a high pressure turbine and the second turbine section is a low pressure turbine.

In a further non-limiting embodiment of any of the foregoing variable area turbine arrangements, the transition duct extends between a radially outer wall and a radially inner wall, the transition duct configured to influence a core airflow communicated through the transition duct prior to communicating the core airflow to the second turbine section.

A gas turbine engine according to an exemplary aspect of the present disclosure includes, among other things, a first turbine section having at least a first array of variable vanes and a second turbine section having at least a second array of variable vanes. A transition duct axially is intermediate of the first turbine section and the second turbine section. At least one stationary vane is positioned within the transition duct and is configured to turn a core airflow prior to communication of the core airflow to the second array of variable vanes.

In a further non-limiting embodiment of the foregoing gas turbine engine, the at least one stationary vane extends between a radially outer wall and a radially inner wall of the transition duct.

In a further non-limiting embodiment of either of the foregoing gas turbine engines, the at least one stationary vane is positioned directly upstream from the second array of variable vanes.

In a further non-limiting embodiment of any of the foregoing gas turbine engines, the at least one stationary vane extends between sloped portions of the transition duct.

In a further non-limiting embodiment of any of the foregoing gas turbine engines, the sloped portions are transverse to an engine centerline longitudinal axis of the gas turbine engine.

A method for reducing incidence angle variation in a gas turbine engine according to another exemplary aspect of the present disclosure includes, among other things, moving a first variable vane of a first turbine section to alter a turbine flow area, communicating core airflow through a transition duct and changing a characteristic of the core airflow within the transition duct. After the step of changing, the core airflow is communicated to a second variable vane of a second turbine section.

In a further non-limiting embodiment of the foregoing method, the second variable vane is moved to alter a turbine flow area of the second turbine section.

In a further non-limiting embodiment of either of the foregoing methods, the step of changing includes positioning at least one stationary vane within the transition duct at a location that is directly upstream of the second variable vane.

In a further non-limiting embodiment of any of the foregoing methods, the step of changing includes straightening the core airflow such that it enters the second turbine section at an angle aligned within the desired inlet angle range of the second variable vane.

In a further non-limiting embodiment of any of the foregoing methods, the step of communicating includes channeling the core airflow between sloped portions of the transition duct.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure is directed to a variable area turbine arrangement for a gas turbine engine. Among other features, the variable area turbine arrangement may include a first turbine section, a second turbine section and a transition duct disposed between the first and second turbine sections. Each of the first and second turbine sections may include variable vanes. The transition duct may include at least one stationary vane configured to reduce the onset of inlet incidence angle variation at the variable vanes of the second turbine section. These and other features are described in detail within this disclosure.

Figure 1:
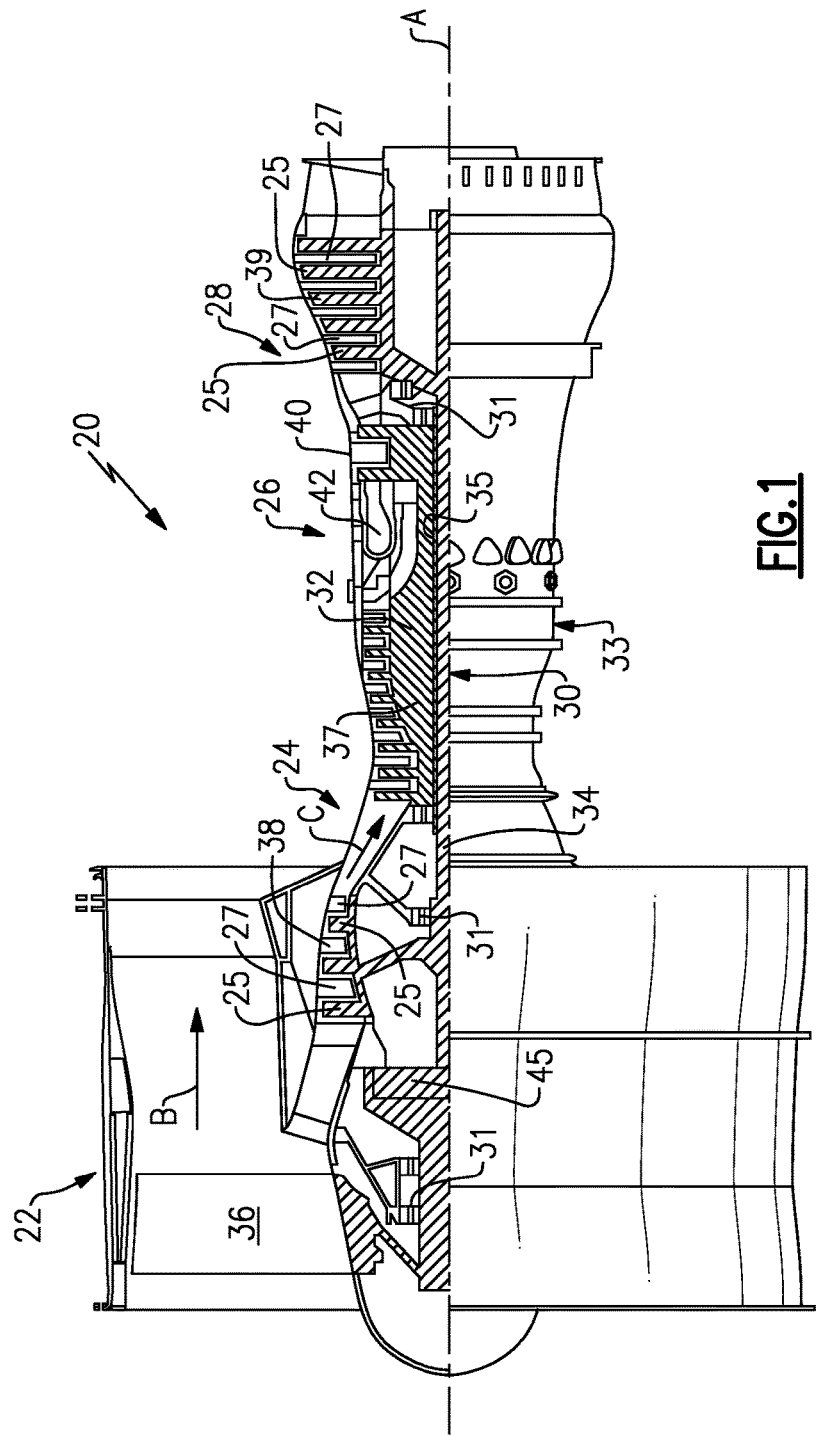
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) or a second bypass stream (not shown) among other systems or features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, and in some configurations, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33. A combustor 42 is arranged between the high pressure compressor 37 and the high pressure turbine 40.

The inner shaft 34 and the outer shaft 35 are concentric and rotate via the bearing systems 31 about the engine centerline longitudinal axis A, which is co-linear with their longitudinal axes. The core airflow is compressed by the fan 36 and/or the low pressure compressor 38 and the high pressure compressor 37, is mixed with fuel and burned in the combustor 42, and is then expanded through the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be calculated by measuring the pressure prior to the inlet of the low pressure turbine 39 and relating it to the pressure measured at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

The compressor section 24 and the turbine section 28 may include alternating rows of rotor assemblies and vane assemblies (shown schematically) that carry airfoils. For example, rotor assemblies carry a plurality of rotating blades 25, while vane assemblies carry flow directing vanes 27 that extend into the core flow path C to influence the hot combustion gases. The blades 25 extract energy (in the form of pressure) from the core airflow that is communicated through the gas turbine engine 20 along the core flow path C. The vanes 27 direct the core airflow to the blades 25 to extract energy.

Figure 2:
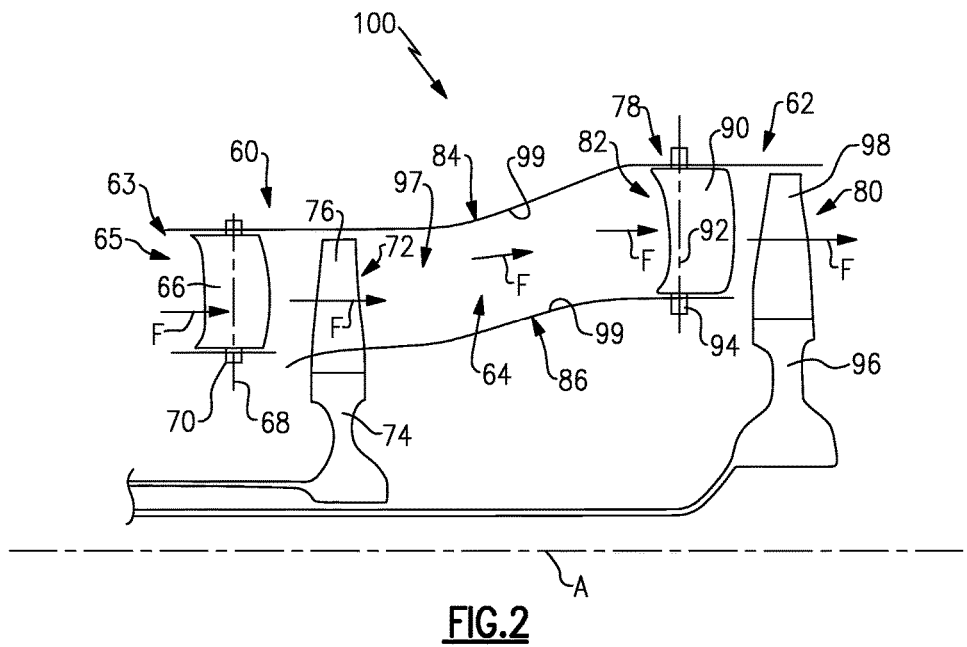
FIG. 2 illustrates a first embodiment of a variable area turbine arrangement that can be incorporated into a gas turbine engine.

FIG. 2 illustrates a variable area turbine arrangement 100 that may be incorporated into a gas turbine engine, such as the gas turbine engine 20 of FIG. 1. In one embodiment, the variable area turbine arrangement 100 represents a portion of the turbine section 28 of the gas turbine engine 20 described above. In another embodiment, the variable area turbine arrangement 100 may make up the entire turbine section 28. Although this embodiment is illustrated with respect to a turbine section of a gas turbine engine, this disclosure could extend to other sections.

The exemplary variable area turbine arrangement 100 includes a first turbine section 60 (i.e., a high pressure turbine), a second turbine section 62 (i.e., a low pressure turbine) downstream from the first turbine section 60, and a transition duct 64 axially intermediate of the first turbine section 60 and the second turbine section 62. In one embodiment, each of the first turbine section 60 and the second turbine section 62 are single stage sections that each include one row of vanes and blades. However, the first and second turbine sections 60, 62 may include additional stages within the scope of this disclosure. In addition, the variable area turbine arrangement 100 could include additional sections beyond the illustrated first and second turbine sections 60, 62.

The first turbine section 60 may include a vane assembly 65 having at least a first variable vane row 66. In one embodiment, the vane assembly 65 includes an array of variable vanes circumferentially disposed about the engine centerline longitudinal axis A. Alternatively, the vane assembly 65 could include a combination of fixed and variable vanes.

In one non-limiting embodiment, the first variable vane row 66 is positioned at an inlet 63 of the first turbine section 60. However, the vane assembly 65 can be disposed elsewhere within the first turbine section 60.

The first turbine section 60 could include any number of variable vanes 66 that are selectively configurable to change a flow parameter associated with the first turbine section 60. In other words, the variable vane(s) of the variable vane row 66 are adjustable to change a flow area of the first turbine section 60 by controlling the amount of core airflow F that is communicated through the first turbine section 60. In one embodiment, at least one vane of the first variable vane row 66 is rotatable about a variable vane spindle axis 68 that extends through a spindle 70 of the vane of the first variable vane row 66. As is known, the vane is pivotable about the variable vane spindle axis 68 in order to change a rotational positioning of the first variable vane row 66 (i.e., change the angle of attack of the vane relative to core airflow F entering the first turbine section 60). This change in rotational positioning influences the flow area of the first turbine section 60.

A rotor assembly 72 is positioned downstream from the vane assembly 65. The rotor assembly 72 includes a rotor disk 74 that carries one or more rotor blades 76. The rotor blade(s) 76 extracts energy from the core airflow F, thereby moving the rotor disk 74 about the engine centerline longitudinal axis A and powering various gas turbine engine loads. The vane assembly 65 and the rotor assembly 72 make up a single stage of the first turbine section 60. The first turbine section 60 could include additional stages within the scope of this disclosure.

The second turbine section 62, which can be a low pressure turbine, may include a single stage that includes a vane assembly 78 and a rotor assembly 80 downstream of the vane assembly. Additional stages may also be incorporated into the second turbine section 62. In one embodiment, the vane assembly 78 is positioned at an inlet 82 of the second turbine section 62, although other locations are also contemplated.

The vane assembly 78 can include at least a second variable vane row 90. In one embodiment, the vane assembly 78 includes an array of variable vanes circumferentially disposed about the engine centerline longitudinal axis A. The vane assembly 78 can include any number of variable vanes 90, or a combination of stationary and variable vanes. Similar to the first variable vane row 66, the second variable vane(s) 90 may be rotatable about a variable vane spindle axis 92 that extends through a spindle 94 of the second variable vane 90. The second variable vane 90 is pivotable about the variable vane spindle axis 92 in order to influence the flow area of the second turbine section 62.

The rotor assembly 80 of the second turbine section 62 can include a rotor disk 96 that carries one or more rotor blades 98. The rotor blades 98 extract energy from the core airflow F, thereby moving the rotor disk 96 about the engine centerline longitudinal axis A and powering various gas turbine engine loads.

In one embodiment, the vane assembly 78 of the second turbine section 62 extends radially outboard relative to the vane assembly 65 of the first turbine section 60. In other words, the second turbine section 62 may be partially elevated relative to the first turbine section 60.

The transition duct 64 is disposed between the first turbine section 60 and the second turbine section 62. The transition duct 64 communicates the core airflow F exiting the first turbine section 60 toward the second turbine section 62. In one embodiment, the transition duct 64 influences a flow direction of the core airflow F, thereby reducing incidence angle variation experienced by the vane assembly 78 of the second turbine section 62. For example, the transition duct 64 may straighten the flow of the core airflow F over its length such that it is communicated at an angle that is substantially aligned within the desired inlet angle range of the second variable vane row 90 of the vane assembly 78. The transition duct 64 can embody any size and shape for channeling the core airflow F between the first turbine section 60 and the second turbine section 62.

In one embodiment, the transition duct 64 includes a radially outer wall 84 and a radially inner wall 86. The core airflow F may be communicated in the space that extends between the radially outer wall 84 and the radially inner wall 86. Each of the radially outer wall 84 and the radially inner wall 86 may include sloped portions 99. In one embodiment, the sloped portions 99 are sloped in the radially outboard direction and extend in a direction that is transverse to the engine centerline longitudinal axis A. The sloped portions 99 are positioned between an outlet 97 of the first turbine section 60 and the inlet 82 of the second turbine section 62, which are both substantially parallel to the engine centerline longitudinal axis A.

The sloped portions 99 of the transition duct 64 may enable the second turbine section 62 to be elevated relative to the first turbine section 60. The transition duct 64 simplifies the flow path of the core airflow F as it is communicated between the first turbine section 60 and the second turbine section 62.

Figure 3:
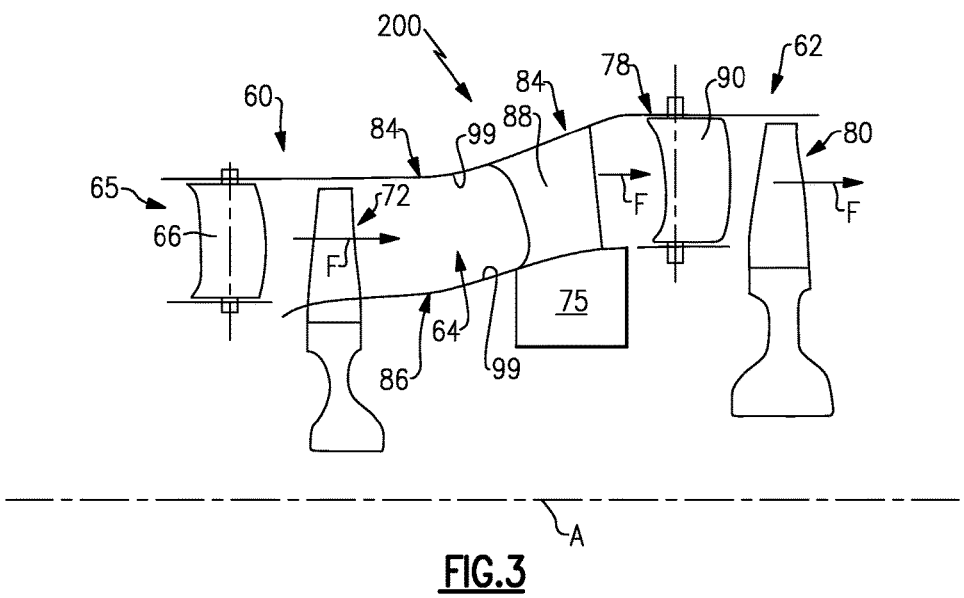
FIG. 3 illustrates a second embodiment of a variable area turbine arrangement that can be incorporated into a gas turbine engine.

FIG. 3 illustrates a second embodiment of a variable area turbine arrangement 200 that may be incorporated into a gas turbine engine. In this disclosure, like reference numerals designate like elements where appropriate.

In this embodiment, the variable area turbine arrangement 200 is similar to the variable area turbine arrangement 100 but incorporates at least one stationary vane 88 (or a variable vane) positioned within the transition duct 64. The transition duct 64 and the stationary vane 88 simplify the aerodynamic design of the vane assembly 78. In one embodiment, the stationary vane 88 extends between the sloped portions 99 of the radially outer wall 84 and the radially inner wall 86.

The stationary vane 88 may be part of a vane assembly that includes one or more stationary vanes annularly disposed about the engine centerline longitudinal axis A. In one embodiment, the stationary vane(s) 88 is positioned directly upstream of the vane assembly 78 of the second turbine section 62. The stationary vane 88 may straighten the flow of the core airflow F such that it is communicated at an angle that is substantially aligned with the desired inlet angle range of the second variable vane 90 of the vane assembly 78. By influencing (i.e., changing a characteristic of) the core airflow F in this manner, the incidence angle variation that occurs at the second variable vane 90 of the second turbine section 62, which can occur as a result of moving the first variable vane row 66 of the first turbine section 60, is significantly reduced.

In another embodiment, the stationary vane(s) 88 of the vane assembly act to structurally support hardware 75 located radially inboard from the transition duct 64. Although shown schematically, the hardware 75 may include a bearing structure, a tangential on-board injection unit (TOBI), service lines, flow routing hardware, or any other hardware.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A variable area turbine arrangement, comprising:
    a first turbine section having at least a first variable vane row circumferentially disposed about a centerline longitudinal axis;
    a second turbine section downstream from said first turbine section and having at least a second variable vane row circumferentially disposed about said centerline longitudinal axis, wherein said second variable vane row is positioned at an inlet of said second turbine section;
    a transition duct disposed between said first turbine section and said second turbine section and including a radially outer wall and a radially inner wall, each of the radially outer wall and radially inner wall including sloped portions sloped in the radially outboard direction from the first turbine section to the second turbine section, wherein said inlet is parallel to said centerline longitudinal axis such that said radially inner wall and said radially outer wall immediately downstream of said inlet are parallel to said central longitudinal axis; and
    at least one stationary vane positioned within said transition duct.

2. The variable area turbine arrangement as recited in claim 1, wherein said at least one stationary vane is positioned directly upstream of said second variable vane.

3. The variable area turbine arrangement as recited in claim 1, wherein said variable area turbine arrangement is part of a low pressure turbine arrangement.

4. The variable area turbine arrangement as recited in claim 1, wherein each of said first variable vane row and said second variable vane row includes a spindle that extends along a variable vane spindle axis.

5. The variable area turbine arrangement as recited in claim 1, wherein said transition duct includes an array of stationary vanes that extend between said radially outer wall and said radially inner wall of said transition duct.

6. The variable area turbine arrangement as recited in claim 1, wherein said second variable vane row extends radially outboard relative to said first variable vane row.

7. The variable area turbine arrangement as recited in claim 1, wherein said first turbine section is a high pressure turbine and said second turbine section is a low pressure turbine.

8. The variable area turbine arrangement as recited in claim 1, wherein said transition duct extends between said radially outer wall and said radially inner wall, said transition duct configured to influence a core airflow communicated through said transition duct prior to communicating said core airflow to said second turbine section.

9. The variable area turbine arrangement as recited in claim 1, wherein said transition duct is positioned to straighten flow of a core airflow such that it is communicated at an angle that is substantially aligned within a desired inlet angle range of said second variable vane row.

10. The variable area turbine arrangement as recited in claim 1, wherein said transition duct includes a sloped portion between said inlet and an outlet of said first turbine section, wherein said outlet is parallel to said central longitudinal axis such that said radially inner wall and said radially outer wall immediately adjacent said outlet are parallel to said longitudinal axis.

11. A gas turbine engine, comprising:
    a first turbine section having at least a first array of variable vanes circumferentially disposed about an engine centerline longitudinal axis;
    a second turbine section having at least a second array of variable vanes circumferentially disposed about said engine centerline axis, wherein said second array of variable vanes is positioned at an inlet of said second turbine section, and said inlet is parallel to said centerline longitudinal axis, such that a radially inner wall and a radially outer wall immediately downstream of said inlet are parallel to said central longitudinal axis;
    a transition duct axially intermediate said first turbine section and said second turbine section; and
    at least one stationary vane positioned within said transition duct and configured to turn a core airflow prior to communication of said core airflow to said second array of variable vanes.

12. The gas turbine engine as recited in claim 11, wherein said at least one stationary vane extends between said radially outer wall and said radially inner wall of said transition duct.

13. The gas turbine engine as recited in claim 11, wherein said at least one stationary vane is positioned directly upstream from said second array of variable vanes.

14. The gas turbine engine as recited in claim 11, wherein said at least one stationary vane extends between sloped portions of said transition duct.

15. The gas turbine engine as recited in claim 14, wherein said sloped portions are transverse to said engine centerline longitudinal axis of the gas turbine engine.

16. A method for reducing incidence angle variation in a gas turbine engine, comprising:
    moving a first variable vane of a first turbine section to alter a turbine flow area; communicating core airflow through a transition duct; changing a characteristic of the core airflow within the transition duct, including straightening the core airflow such that it enters the second turbine section at an angle aligned within the desired inlet angle range of the second variable vane; and after the step of changing, communicating the core airflow to a second variable vane of a second turbine section, wherein said second variable vane is positioned at an inlet of said second turbine section, and wherein said inlet is parallel to a centerline longitudinal axis of the gas turbine engine such that a radially inner wall and a radially outer wall immediately downstream of said inlet are parallel to said central longitudinal axis.

17. The method as recited in claim 16, comprising moving the second variable vane to alter a turbine flow area of the second turbine section.

18. The method as recited in claim 16, wherein the step of changing includes positioning at least one stationary vane within the transition duct at a location that is directly upstream of the second variable vane.

19. The method as recited in claim 16, wherein the step of communicating includes channeling the core airflow between sloped portions of the transition duct.

* * * * *